US011585443B2

(12) United States Patent
Ma

(10) Patent No.: US 11,585,443 B2
(45) Date of Patent: Feb. 21, 2023

(54) DOUBLE SEALING STRUCTURE OF ELECTRONIC VALVE, SEALING STRUCTURE OF ELECTRONIC VALVE, AND ELECTRONIC VALVE WITH STATIC SEALING STRUCTURE

(71) Applicant: ZHEJIANG YINLUN MACHINERY CO., LTD., Zhejiang (CN)

(72) Inventor: Jun Ma, Zhejiang (CN)

(73) Assignee: ZHEJIANG YINLUN MACHINERY CO., LTD., Zhejiang (CN)

( * ) Notice: Subject to any disclaimer, the term of this patent is extended or adjusted under 35 U.S.C. 154(b) by 0 days.

(21) Appl. No.: 17/370,754

(22) Filed: Jul. 8, 2021

(65) Prior Publication Data
US 2021/0372531 A1 Dec. 2, 2021

Related U.S. Application Data

(63) Continuation-in-part of application No. PCT/CN2020/070301, filed on Jan. 3, 2020.

(30) Foreign Application Priority Data

Jan. 8, 2019 (CN) .......................... 201910016511.5
Jan. 8, 2019 (CN) .......................... 201920027853.2

(51) Int. Cl.
*F16K 1/46* (2006.01)
*F16K 1/14* (2006.01)
*F16K 1/36* (2006.01)

(52) U.S. Cl.
CPC ............... *F16K 1/465* (2013.01); *F16K 1/14* (2013.01); *F16K 1/36* (2013.01)

(58) Field of Classification Search
CPC ..... F16K 1/465; F16K 1/14; F16K 1/36; F16K 5/0464; F16K 5/0485; F16K 31/535; F16K 11/0853; F01P 7/165; F01P 2007/146
See application file for complete search history.

(56) References Cited

U.S. PATENT DOCUMENTS

2007/0267588 A1* 11/2007 McLane ................ F16K 5/0464
251/175
2015/0075452 A1* 3/2015 Oikawa ................... F01P 11/14
123/41.1
2017/0211460 A1* 7/2017 Suzuki ................ F16K 11/0876

FOREIGN PATENT DOCUMENTS

CN 2429698 Y 5/2001
CN 202545879 U 11/2012
(Continued)

OTHER PUBLICATIONS

International Search Report of International Application No. PCT/CN2020/070301 dated Mar. 25, 2020.
(Continued)

*Primary Examiner* — Marina A Tietjen
(74) *Attorney, Agent, or Firm* — IP & T Group LLP

(57) ABSTRACT

Provided are sealing member for electronic valve, electronic valve with sealing member, electronic valve with static sealing structure, and electronic valve with double sealing structure. The sealing member has inlet end connected to valve core and outlet end connected to connecting pipe; the electronic valve includes valve body, valve cover, flow rate control device, and the connecting pipe; the flow rate control device includes the valve core; the valve body is provided therein with valve core accommodating chamber and connecting pipe connection port; the valve core is disposed in the valve core accommodating chamber; the connecting pipe is welded to end of the connecting pipe connection port on (Continued)

the valve body. The electronic valve further includes the above sealing member, and the sealing member is located between the connecting pipe and the connecting pipe connection port. Meanwhile, the electronic valve includes static sealing structure and/or double sealing structure.

20 Claims, 8 Drawing Sheets

(56) References Cited

FOREIGN PATENT DOCUMENTS

| CN | 206449233 U | | 8/2017 | |
|---|---|---|---|---|
| CN | 108730553 A | * | 11/2018 | ........... F16K 27/067 |
| CN | 109538818 A | | 3/2019 | |
| CN | 209444826 U | | 9/2019 | |
| KR | 10-2017-0069811 A | | 6/2017 | |
| KR | 102170927 B1 | * | 10/2020 | |

OTHER PUBLICATIONS

Written Opinion of The International Searching Authority of International Application No. PCT/CN2020/070301 dated Mar. 25, 2020.

* cited by examiner ically. The present disclosure relates to the field of electronic valve products used in thermal management systems of new energy automobile, in particular, to a sealing member for an electronic valve, an electronic valve with a sealing member, an electronic valve with a static sealing structure, and an electronic valve with a double sealing structure.

DOUBLE SEALING STRUCTURE OF ELECTRONIC VALVE, SEALING STRUCTURE OF ELECTRONIC VALVE, AND ELECTRONIC VALVE WITH STATIC SEALING STRUCTURE

CROSS-REFERENCE TO RELATED APPLICATION

This application is a continuation-in-part of PCT application no. PCT/CN2020/070301 filed on Jan. 3, 2020, which claims the priority to the Chinese patent application with the filing No. 201910016511.5, filed on Jan. 8, 2019 with the Chinese Patent Office, and entitled "Double Sealing Structure of Electronic Valve", and the priority to the Chinese patent application with the filing No. 201920027853.2, filed on Jan. 8, 2019 with the Chinese Patent Office, and entitled "Sealing Structure of Electronic Valve", the contents of which are incorporated herein by reference in entirety.

TECHNICAL FIELD

The present disclosure relates to the technical field of new energy automobiles, and in particular, to the field of electronic valve products used in thermal management systems of new energy automobile, in particular, to a sealing member for an electronic valve, an electronic valve with a sealing member, an electronic valve with a static sealing structure, and an electronic valve with a double sealing structure.

BACKGROUND ART

The electronic valve products are configured to control a flow direction and flow rate of a fluid medium circuit in a new energy cooling system.

It was found in studies:

after the electronic valve is used for a long time, a valve core and a valve body frictionally erode against a sealing surface significantly, and a sealing position between a sealing member and the valve core and a sealing position between the sealing member and the valve body are prone to unreliable sealing, and a fluid medium in the valve body leaks out, thus causing the electronic valve to fail.

SUMMARY

Objectives of the present disclosure include, for example, providing a sealing member for an electronic valve and an electronic valve with a sealing member, so as to solve at least one technical problem in the above technical problems existing in the prior art.

Objectives of the present disclosure further include, for example, providing an electronic valve with a static sealing structure, so as to solve at least one technical problem in the above technical problems existing in the prior art.

Objectives of the present disclosure further include, for example, providing an electronic valve with a double sealing structure, so as to solve at least one technical problem in the above technical problems existing in the prior art.

Embodiments provided in the present disclosure are realized as follows.

The present disclosure provides a sealing member for an electronic valve, the sealing member is provided between a valve core and a connecting pipe inside the electronic valve, the sealing member has an inlet end connected to the valve core and an outlet end connected to the connecting pipe, wherein the inlet end of the sealing member is in interference fit with the valve core, to form a first sealing region; an inner wall of the sealing member is provided with annular ribs, and the ribs are in interference fit with an outer circumferential surface of an end of the connecting pipe, to form a second sealing region; and an end of the connecting pipe is further provided with an annular sealing plane, and the sealing plane is in fit with the outlet end of the sealing member, to form a third sealing region.

Optionally, the ribs are at least two, and the at least two ribs are arranged at intervals in a direction from the inlet end to the outlet end.

Optionally, an inner diameter of the sealing member gradually increases in a direction from the inlet end to the outlet end, and correspondingly, an outer diameter of part of the connecting pipe that is a sleeving part with the sealing member gradually increases from an end close to the valve core to an end away from the valve core.

Optionally, the inlet end of the sealing member has an inlet end surface fitted with the valve core, and the inlet end surface is provided with an abrasion-resistant lubricating coating.

Optionally, an interference amount of the fitting between the ribs and the connecting pipe is not less than 5%.

Optionally, an interference amount of the fitting between the inlet end of the sealing member and the valve core is not less than 5%.

An embodiment of the present disclosure further provides an electronic valve having a sealing member, including a valve body, a valve cover, a flow rate control device, and a connecting pipe; the flow rate control device includes a valve core; the valve body is provided therein with a valve core accommodating chamber and a connecting pipe connection port; the valve core is disposed in the valve core accommodating chamber; the connecting pipe is welded to an end portion of the connecting pipe connection port on the valve body, wherein the electronic valve further includes the above sealing member, and the sealing member is located between the connecting pipe and the connecting pipe connection port.

An embodiment of the present disclosure further provides an electronic valve with a static sealing structure, wherein the electronic valve further includes a power device, wherein the power device includes a gear train, a control board, and a motor; the motor includes a shell, a stator, and a rotor; a sleeve is provided between the stator and the rotor, an opening end of the sleeve is connected to the valve body, and the rotor, the gear train, and the valve core are all placed in a closed fluid medium environment.

Optionally, a sealing ring is provided between the opening end of the sleeve and the valve body so as to form a static sealing structure.

Optionally, the sleeve includes a sleeve body and an annular flange connected to each other, the sleeve body has one end being closed and the other end as the opening end, the flange is located at the opening end and extends outward, the flange has an annular groove extending around a circumferential direction of the sleeve body, and the sealing ring is provided in the annular groove.

Optionally, the sleeve and the valve body are molded in one piece.

Optionally, the sleeve is fixedly connected to the valve body by a screw, a snap-fit or a rivet.

Optionally, an outer surface of the valve body has a planar mounting portion, the planar mounting portion is provided with a through hole in communication with an inner cavity of the valve body and an annular mounting groove surrounding the through hole, an end surface where the opening end of the sleeve is located is fitted to the planar mounting portion, the sleeve is in communication with the through hole, and the sealing ring is provided in the annular mounting groove.

Optionally, the shell is detachably connected to the valve body.

Optionally, an output shaft of the motor extends into the valve body, and the output shaft is in transmission connection with an input gear of the gear train, and an output gear of the gear train is configured to drive the valve core to move.

Optionally, the valve cover is welded to the valve body.

The present disclosure further provides an electronic valve with a double sealing structure, including a valve body and a valve core, the valve body is formed as one piece by injection molding, a first sealing ring and a second sealing ring are provided between the valve body and the valve core to prevent a fluid medium from leaking into an upper power device mounting space, and the first sealing ring and the second sealing ring are arranged at intervals vertically along an axial direction of the valve core, so as to form a double sealing structure.

Optionally, the valve body includes a valve body upper portion, a valve body neck portion, and a valve body lower portion connected in sequence, and the first sealing ring and the second sealing ring are provided in the valve body neck portion.

Optionally, an inner circumferential surface of the valve body is provided with a convex ring, a top plane of the convex ring facing away from the valve body lower portion, an inner circumferential surface of the valve body, and an outer circumferential surface of the valve rod together form a first sealing ring groove in a ring shape, and the first sealing ring is provided in the first sealing ring groove; a bottom plane of the convex ring close to the valve body lower portion, an inner circumferential surface of the valve body neck portion, and the outer circumferential surface of the valve rod together form a second sealing ring groove, and the second sealing ring is provided in the second sealing ring groove.

Optionally, the first sealing ring is spaced from the top plane, and/or the second sealing ring is spaced from the bottom plane.

Optionally, the valve core includes a core body and a valve rod, the core body is provided with a flow channel, a stepped surface protruding from the outer circumferential surface of the valve rod is provided at a junction between the valve rod and the core body; and the first sealing ring and the second sealing ring are sheathed outside the valve rod.

Compared with the prior art, the embodiments of the present disclosure include, for example, following beneficial effects.

To sum up, after the electronic valve is used for a long time, in particular, the valve core and the valve body frictionally erode against the sealing surface significantly, the sealing of the sealing ring may be unreliable after being corroded by friction, and internal leakage may occur to the fluid medium in the valve body, thus causing the electronic valve to fail.

For the sealing member for an electronic valve and the electronic valve having a sealing member provided in the present disclosure, the sealing member forms multiple sealing with the valve core and the connecting pipe through three sealing regions, which greatly improves the sealing performance of the product, thereby ensuring that the fluid medium in the flow channel does not leak.

For the electronic valve with a static sealing structure provided in the present disclosure, the sleeve enables the rotor and the stator to be located in two separate spaces after separating the rotor and the stator of the motor. An end of the rotor is provided with a motor gear, and cooperates with the gear train, an output gear of the gear train is connected to the valve core, the rotor, the gear train, and the valve core are all placed in the fluid medium environment, an inner chamber of the valve body is closed by the valve cover, the sealing position of the valve cover and the valve body and the sealing position of the sleeve and the valve body are not relatively moved, then it is quite easy to realize sealing, and the sealing effect is better; meanwhile, no wear occurs at the sealing positions, then the service life of the components at the sealing positions is longer, and the sealing lasts for a long time.

The electronic valve with a double sealing structure provided in the present disclosure may greatly improve the sealing effect of the electronic valve, and help to increase the reliability of the product and prolong the service life. Since the present disclosure adopts a one-piece valve body structure, there is no need to provide a sealing ring between the valve body upper portion and the valve body lower portion, and the overall sealing effect of the electronic valve is improved without increasing the number of sealing rings.

BRIEF DESCRIPTION OF DRAWINGS

The present disclose is further described below in combination with accompanying drawings and embodiments.

In the drawings.

1—valve body, 2—valve core, 3—lower end cover, 4—first sealing ring, 5—second sealing ring, 6—gear, 7—first sealing ring groove, 8—second sealing ring groove; 101—valve core accommodating chamber, 102—valve body lower portion, 103—valve body neck portion, 104—convex ring, 105—valve body upper portion, 106—bottom plane, 107—inner side surface, 108—top plane, 109—inner circumferential surface, 110—reinforcing rib; 201—core body, 202—flow channel, 203—valve rod, 205—stepped surface, 206—first outer circumferential surface;

10—sealing member, 20—valve body, 30—connecting pipe, 40—valve core, 50—first sealing region, 60—second sealing region, 70—third sealing region, 80—arrow; 1010—outer wall, 1020—reinforcing rib, 1030—rib, 1040—inner wall, 1050—inlet end, 1060—outlet end, 1070—inlet end surface, 1080—outlet end surface, 1090—insertion channel; 2010—valve core accommodating chamber, 2020—connecting pipe connection port; 3010—annular flange, 3020—annular sealing plane, 3030—insertion portion, 3040—second outer circumferential surface, 3050—flow channel, 3060—welding site;

001—power device, 002—valve cover, 003—flow rate control device, 004—valve body, 005—connecting pipe, 007—third sealing ring, 11—motor, 12—gear train, 13—control board, 111—motor shell, 112—stator, 113—sleeve, 114—rear bearing, 115—rotor, 116—motor gear, 117—front bearing, 118—front bearing seat, 1111—casing, 1112—snap-fit, 1113—connecting tooth groove, 1114—first connecting lug, 1115—second mounting hole, 1116—opening end, 1131—sleeve body, 1132—flange, 1133—second connecting lug, 1134—first mounting hole, 1135—step, 1136—connecting tooth groove, 1137—annular groove, 1138—rear bearing seat, 1139—first opening end, 121—output gear, 21—valve body sealing plate, 22—PCB box, 23—junction box, 24—upper end cover, 25—snap-fit, 31—valve core, 41—motor mounting seat, 42—upper chamber, 43—connecting pipe connection port, 44—lower chamber, 45—first clamping groove, 46—second clamping groove, 47—side wall, 48—front bearing seat cavity, 49—perforation hole, 401—planar mounting portion.

DETAILED DESCRIPTION OF EMBODIMENTS

In the description of the present disclosure, direction or position indicated by "upper", "lower", "left", "right", "top", "bottom" and so on are based on directional or positional relationships as shown in the accompanying drawings, merely for facilitating describing the present disclosure and simplifying the description, rather than indicating or suggesting that related devices or elements have to be in the specific orientation or configured or operated in a specific orientation, therefore, they should not be construed as limiting the present disclosure.

Figure 1:
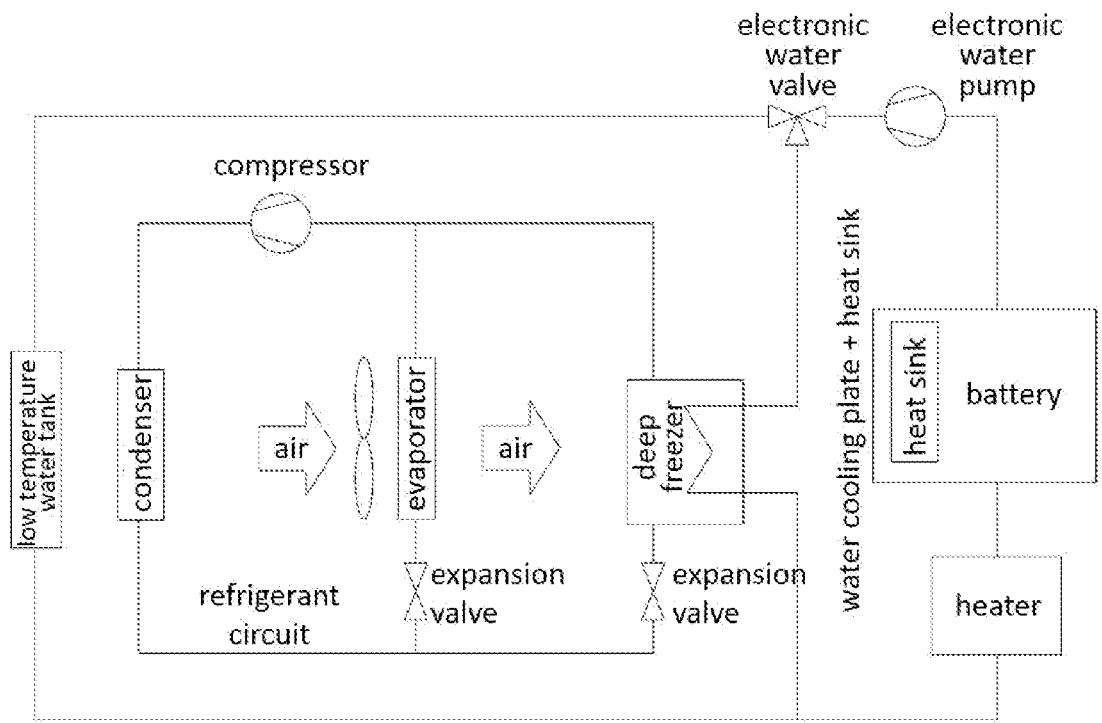
FIG. 1 is a schematic diagram of an electronic valve used in a battery thermal management circuit.
Figure 2:
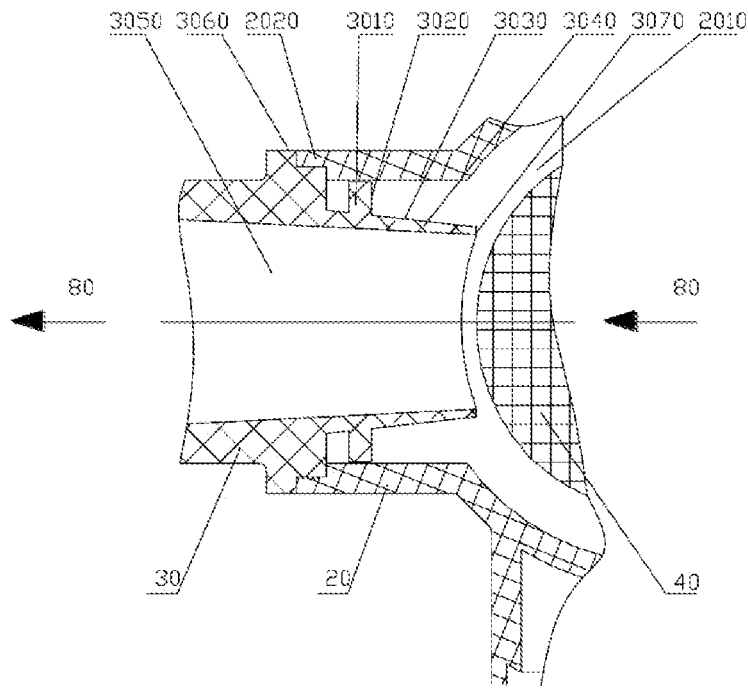
FIG. 2 is a perspective view of a sealing member in the present disclosure.

What is shown in FIG. 1 is a diagram of a liquid cooling and heating system for new energy battery in the prior art. The electronic valve of the present disclosure is configured to control a flow direction and flow rate of a fluid medium circuit in the new energy cooling system.

Referring to FIG. 2-FIG. 5, an exemplary embodiment of a sealing structure of an electronic valve according to the present disclosure is shown. According to the illustrated exemplary embodiment, the sealing structure for an electronic valve includes a valve body 20, a sealing member 10, a valve core 40, and a connecting pipe 30. In order to better illustrate structural features of various parts, the sealing member 10 is first removed from FIG. 2, and only an assembled structure of the valve body 20, the connecting pipe 30, and the valve core 40 is shown. In the above, the valve body 20 is provided therein with a valve core accommodating chamber 2010 and a connecting pipe connection port 2020. The valve core 40 is disposed in the valve core accommodating chamber 2010. The connecting pipe 30 is welded to an end of the connecting pipe connection port 2020 on the valve body 20.

Optionally, a flow channel (not shown in figure) is provided in the valve core 40. The fluid medium flows from the flow channel of the valve core 40 to a flow channel 3050 in the connecting pipe 30 according to a direction indicated by an arrow 80.

An upper portion of the valve core 40 is configured to be in transmission connection with a gear train of a power device (not shown in figure), and can rotate about its mandrel under driving by the power device.

When the flow channel of the valve core 40 is not in communication with the flow channel 3050 in the connecting pipe 30, the electronic valve is in a closed state.

After the valve core 40, driven by the powder device, is rotated by a certain angle in a preset direction, the flow channel in the valve core 40 and the flow channel 3050 in the connecting pipe 30 start to be partially in communication. The valve core 40 is rotated continuously in the preset direction, a communication area of the flow channel of the valve core 40 with the flow channel 3050 in the connecting pipe 30 gradually increases, and a flow rate downstream in communication with the connecting pipe 30 also increases therewith.

The valve core 40 is rotated continuously in the preset direction, and when an axis of the flow channel of the valve core 40 and an axis of the flow channel 3050 in the connecting pipe 30 are located in a same straight line, a communication area of the two is maximum, and at this time, the electronic valve is in a state with a maximum flow rate.

That is, by controlling a rotation angle of the valve core 40, switching and flow rate control of the electronic valve can be realized.

For the purpose of accurate flow rate control, the fluid medium entering from the flow channel of the valve core 40 into the flow channel 3050 of the connecting pipe 30 cannot flow back into the valve core accommodating chamber 2010 of the valve body 20. Therefore, it is necessary to provide a sealing member 10 between the valve core 40 and the connecting pipe 30.

Optionally, the connecting pipe 30 has an insertion portion 3030 configured to be inserted into the connecting pipe connection port 2020. The insertion portion 3030 may be of a circular tube structure or a tapered tube structure with a certain taper angle on outer circumferential surface. In the present disclosure, an outer circumferential surface 3040 of the insertion portion 3030 serves as a sealing surface in sealing connection with the sealing member 10. Optionally, the insertion portion 3030 is configured as a tapered tube structure, and the second outer circumferential surface 3040 of the insertion portion 3030 is a tapered surface, and can be better guided into the sealing member 10 to form close contact. The thickness of the insertion portion 3030 may be the same or may be gradually decreased. For example, the thickness of the insertion portion 3030 gradually decreases in an axial direction thereof from an end away from the valve core 40 to an end close to the valve core 40.

Optionally, an annular flange 3010 is further provided on the outer circumferential surface of the insertion portion 3030, and the annular flange 3010 protrudes from the outer circumferential surface of the insertion portion 3030 in a direction perpendicular to the axis of the connecting pipe 30. The annular flange 3010 is located between an end surface 3070 of the insertion portion 3030 close to the valve core 40 and a welding site 3060 between the connecting pipe 30 and the valve body 20. An annular plane 3020 of the annular flange 3010 facing the valve core 40 is provided as another sealing surface for the connecting pipe 30 and the sealing member 10.

Figure 3:
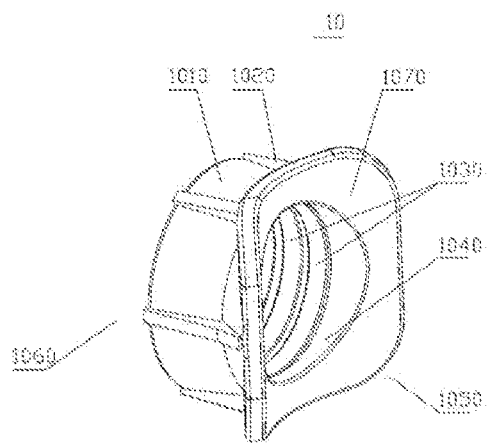
FIG. 3 is a structural schematic view of the sealing member in the present disclosure.
Figure 4:
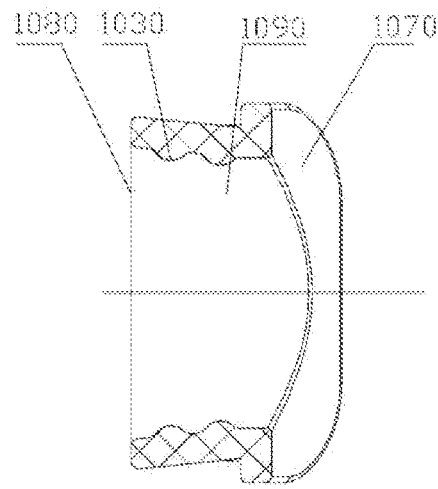
FIG. 4 is a schematic view of a sealing structure in the present disclosure.
Figure 5:
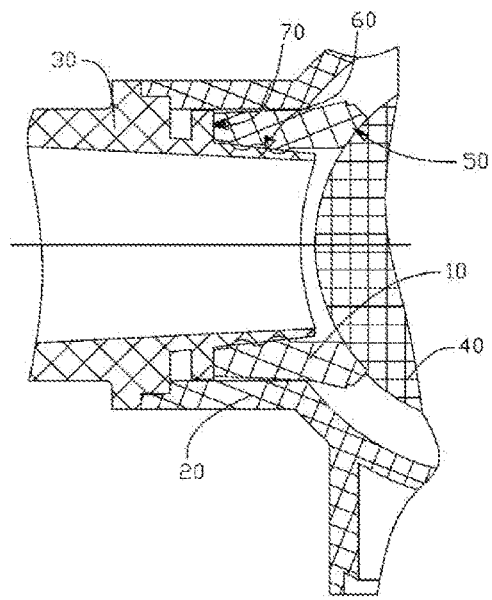
FIG. 5 is a perspective view of an electronic valve in the present disclosure.

Referring to FIG. 3, FIG. 4, and FIG. 5, optionally, the sealing member 10 of the present disclosure has an inlet end 1050 connected to the valve core 40 and an outlet end 1060 connected to the connecting pipe 30, the inlet end 1050 and the outlet end 1060 are in communication with each other, the inlet end 1050 has an inlet end surface 1070, and the inlet end surface 1070 may be a tapered surface, which can increase the contact area; and the outlet end 1060 has an outlet end surface 1080. An insertion channel 1090 configured for insertion of the connecting pipe 30 is provided between the inlet end 1050 and the outlet end 1060. A part of the valve core 40 protrudes from the inlet end 1050 into the sealing member 10, so that the inlet end surface 1070 of the sealing member 10 is in interference fit with the valve core 40, and the sealing member 10 is in contact with the inlet end surface 1070 to form a first sealing region 50.

Optionally, an inner wall of the sealing member 10 is provided with annular ribs 1030. Optionally, the ribs 1030 are located on an inner wall of the insertion channel 1090, the ribs 1030 are of an annular structure, and the ribs 1030 extend along a circumferential direction of the sealing member 10. After the insertion portion 3030 is inserted into the sealing member 10, the ribs 1030 are in interference fit with the second outer circumferential surface 3040 of the insertion portion 3030 to form a second sealing region 60; and an outlet end surface 1080 of the sealing member 10 cooperates with an annular sealing plane 3020 of the connecting pipe 30 to form a third sealing region 70.

According to the sealing structure of the electronic valve provided in the present disclosure, multiple sealing is formed between the sealing member 10 and the valve core 40 and the connecting pipe 30 through three sealing regions, which greatly improves the sealing performance of a product, thereby ensuring that the fluid medium in the flow channel does not leak.

Optionally, the number of ribs 1030 is two or more, and the two or more ribs 1030 are arranged at intervals along an axial direction of the sealing member 10. In other words, the two or more ribs 1030 are arranged at intervals along a direction from the inlet end 1050 to the outlet end 1060 of the sealing member 10. Optionally, a gap between adjacent ribs 1030 is greater than 1 mm. While improving the sealing performance of the electronic valve, the elasticity of the sealing member 10 is not affected, thus keeping a torsional force of the valve core 40 within a smaller range. An interference amount of the fitting between the ribs 1030 and the outer circumferential surface 3040 of the insertion portion 3030 is not less than 5%.

Optionally, an inner wall 1040 of the sealing member 10 is adapted to a structure of the insertion portion 3030 of the connecting pipe 30. Optionally, the inner wall 1040 of the sealing member 10 is of a tapered shape, in other words, an inner diameter of the inner wall 1040 of the sealing member 10 gradually increases in a direction from the inlet end 1050 to the outlet end 1060, that is, an inner diameter of the outlet end 1060 of the sealing member 10 for insertion of the insertion portion 3030 is larger, which facilitates guiding the insertion portion 3030 to be inserted into the sealing member 10. Correspondingly, the second outer circumferential surface 3040 of the insertion portion 3030 is configured as a tapered surface, and an outer diameter of an end of the insertion portion 3030 close to the valve core 40 is smaller than an outer diameter of an end away from the valve core 40, thereby facilitating insertion of the insertion portion 3030 into the sealing member 10.

Optionally, a system structure of the electronic valve is not limited, for example, a butterfly valve may be used. The valve core 40 may be of any shape, including, but not limited to, a cylindrical shape or a spherical shape. The inlet end 1050 of the sealing member 10 has an inlet end surface 1070 adapted to the shape of the valve core 40, for example, the inlet end surface 1070 may be an arc-shaped surface, a parabolic surface, a spherical surface, a saddle surface, or the like. An interference amount of the fitting between the inlet end 1050 of the sealing member 10 and the valve core 40 is not less than 5%.

Optionally, the inlet end surface 1070 of the sealing member 10 is overlaid with an abrasion-resistant lubricating coating. The abrasion-resistant lubricating coating can reduce the friction between the sealing member 10 and the valve core 40, thus prolonging the service life of the electronic valve. Meanwhile, the torsional force of the valve core 40 is kept within a smaller range.

In the present disclosure, the material of the abrasion-resistant lubricating coating is not specifically limited, and materials meeting the performance requirements can be used. Optionally, the abrasion-resistant lubricating coating is made of a ceramic material, such as $Al_2O_3$ ceramic. The ceramic material has advantages of high hardness and good abrasion resistance. Adding to $Al_2O_3$ the ceramic materials such as $TiO_2$ and $ZrO_2$ and solid lubricants is conducive to improving its friction and wear properties.

Optionally, the abrasion-resistant lubricating coating also may be made of a self-lubricating material such as graphite and $Mo_2S$. In order to better exert the friction and wear properties of graphite and $Mo_2S$, a composite material based on these two materials may also be used.

Optionally, an outer wall 1010 of the sealing member 10 is further provided with reinforcing ribs 1020. The reinforcing rib 1020 may increase a reaction force after the sealing member 10 is compressed, increase the compression resistance of the sealing member 10, and prevent the problem of lowering the sealing performance caused by appearance of a sealing gap, thereby further increasing the sealing reliability.

Optionally, the number of reinforcing ribs 1020 is one or more. The reinforcing ribs 1020 may be arranged in a circumferential direction, and the plurality of reinforcing ribs 1020 are arranged at intervals along an axial direction of the sealing member 10; the reinforcing ribs 1020 may also be arranged in an axial direction, and the plurality of reinforcing ribs 1020 are arranged at intervals along the circumferential direction of the sealing member 10. In the present disclosure, optionally, the number of reinforcing ribs 1020 is plural, each reinforcing rib 1020 is of an elongated structure and extends along the axial direction of the sealing member 10, and the plurality of reinforcing ribs 1020 are uniformly distributed along the circumferential direction of the sealing member 10.

Optionally, the sealing member 10 is made of an elastic material. Optionally, the sealing member 10 is made of a rubber material. Alternatively, the sealing member 10 is made of EPDM, and the present disclosure enables the sealing member 10 to have the properties of a high cost performance, excellent aging resistance properties, excellent chemical resistance properties, excellent insulation properties, and a wide applicable temperature range.

Figure 6:
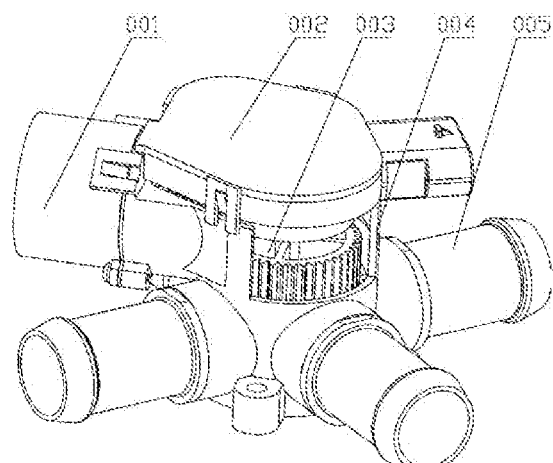
FIG. 6 is a structural schematic view of the electronic valve in the present disclosure.
Figure 7:
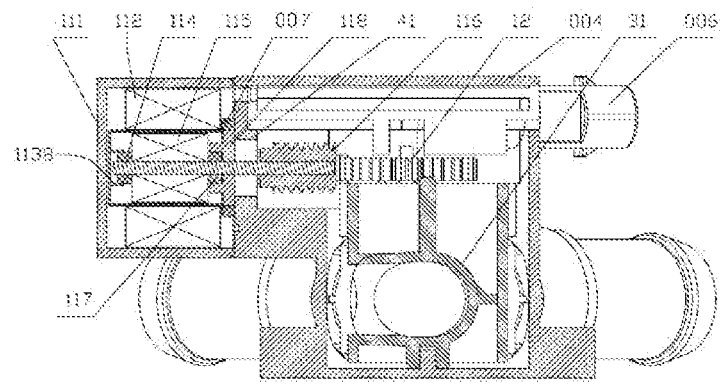
FIG. 7 is an exploded view of the electronic valve in the present disclosure.
Figure 8:
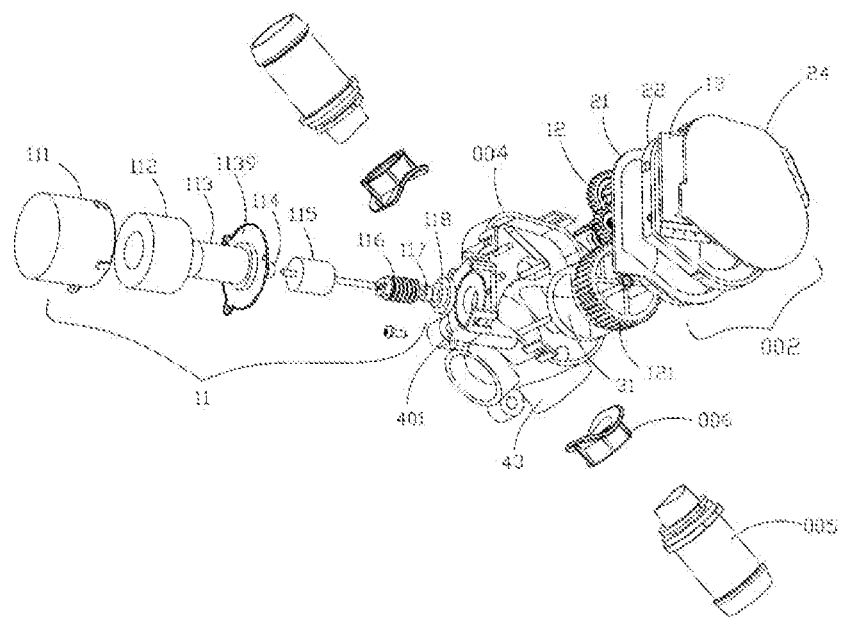
FIG. 8 is a perspective view of a sleeve in the present disclosure.

Referring to FIG. 6, FIG. 7, and FIG. 8, an exemplary embodiment of an electronic valve with a static sealing structure according to the present disclosure is shown. In the illustrated embodiment, the electronic valve includes a valve body 004, a valve cover 002, a flow rate control device 003, a power device 001, and a connecting pipe 005; the flow rate control device 003 includes a valve core 31, and the valve core 31 is movably connected to the valve body 004, so as to adjust a position of the valve core 31 with respect to the valve body 004, further adjusting the flow channel and the flow rate; the power device 001 includes a gear train 12, a control board 13, and a motor 11, the motor 11 is electrically connected to the control board 13, the motor 11 is in transmission connection with the gear train 12, so as to drive the gear train 12 to rotate so as to output a torque; the motor 11 includes a shell 111, a stator 112, and a rotor 115, and both the stator 112 and the rotor 115 are located in the shell 111. A sleeve 113 is further provided between the stator 112 and the rotor 115, a first opening end 1139 of the sleeve 113 is connected to the valve body 004, a connecting position of the sleeve 113 and the valve body 004 is sealed, and the rotor 115, the gear train 12, and the valve core 31 are all placed in a closed fluid medium environment.

According to the electronic valve provided in the present disclosure, the sleeve 113 separates the rotor 115 of the motor from the stator 112 and positions the rotor 115 and the stator 112 in two separate spaces. An end of the rotor 115 is provided with a motor gear 116, and cooperates with the gear train 12, an output gear 121 of the gear train 12 is connected to the valve core 31, so that moving components such as the rotor 115, the gear train 12, and the valve core 31 are all placed in the fluid medium environment, an inner chamber of the valve body 004 is closed by the valve cover 002, the sealing position of the valve cover 002 and the valve body 004 and the sealing position of the sleeve 113 and the valve body 004 are not relatively moved, then it is quite easy to realize sealing, and the sealing effect is better; meanwhile, no wear occurs at the sealing positions, then the service life of the components at the sealing positions is longer, and the sealing lasts for a long time.

In other words, the present disclosure adopts the static sealing structure, and since the components at the sealing positions do not have relative movement and have no friction loss, the sealing is quite reliable, and no external leakage phenomenon occurs to the fluid medium in the valve body 004, then the service life of the electronic valve can be greatly prolonged.

The sleeve 113 and the valve body 004 may be integrally formed; obviously, the sleeve 113 and the valve body 004 may also be separate structures, i.e. the valve body 004 and the sleeve 113 are processed separately and then assembled into one piece. In the present disclosure, the sleeve 113 is separated from the valve body 004, and the two are separately processed and molded, respectively, which is convenient for processing and manufacturing, and saves processing costs. When assembling the sleeve 113 and the valve body 004, a third sealing ring 007 is provided between the sleeve 113 and the valve body 004, so as to realize a sealing connection between the sleeve 113 and the valve body 004.

Optionally, the third sealing ring 007 may be an O-ring or an X-ring. As there is no relative movement between the sleeve 113 and the valve body 004, the sealing position of the sleeve 113 and the valve body 004 is statically sealed, which is not only easy to realize, but also the third sealing ring 007 is not easily worn, then the service life of the third sealing ring 007 will not be shortened.

In the present disclosure, optionally, the sleeve 113 and the valve body 004 may be connected in a fixed manner or in a detachable manner. Welding may be adopted for the fixed connection. The detachable connection includes, but is not limited to, fixation by a screw, a snap-fit, or a rivet. In the present disclosure, the sleeve 113 and the valve body 004 are connected by a screw.

Assembling is carried out in the following manner in the present disclosure:

1. mounting the valve core 31 into a lower chamber 44 of the valve body 004;

2. mounting the gear train 12 into an upper chamber 42 of the valve body 004, and sheathing the output gear 121 of the gear train 12 outside the valve core 31 so as to enable the two to cooperate and connect, wherein the valve core 31 rotates with the rotation of the output gear 121;

3. mounting a front bearing seat 118 of the motor 11 into a front bearing seat cavity 48 of a motor mounting seat 41, sheathing the front bearing 117 on a rotating shaft of the rotor 115 of the motor 11, making the rotating shaft of the motor 11 pass through a perforation hole 49 in the motor mounting seat 41 from the outside, and then mounting the motor gear 116 on a front end of the rotating shaft, wherein the motor gear 116 meshes with an input gear of the gear train 12;

4. sheathing a rear bearing 114 on the front end the rotating shaft of the motor; sheathing the sleeve 113 on the rotor 115, and disposing the rear bearing 114 in a rear bearing seat 1138 of the sleeve 113; and placing the third sealing ring 007 in a groove 1137 of the sleeve 113;

5. sheathing the motor shell 111 on the sleeve 113, aligning a second connecting lug 1133 on the sleeve 113 with a first connecting lug on the motor shell 111, and aligning a first mounting hole 1134 with a second mounting hole 1115, and meanwhile, enabling a tooth groove 1136 on the sleeve 113 and a tooth groove 1113 on the motor shell 111 to form the fitting in a manner of tooth-groove correspondence; and 6. connecting the motor shell 111 with the second clamping groove 46 on the motor mounting seat 41 through a snap-fit 1112, and then fixing the sleeve 113 and the motor shell 111 onto the motor mounting seat 41 by screws.

The above assembling manner is not unique, and may be adjusted according to shapes and connection manners of various components.

Figure 9:
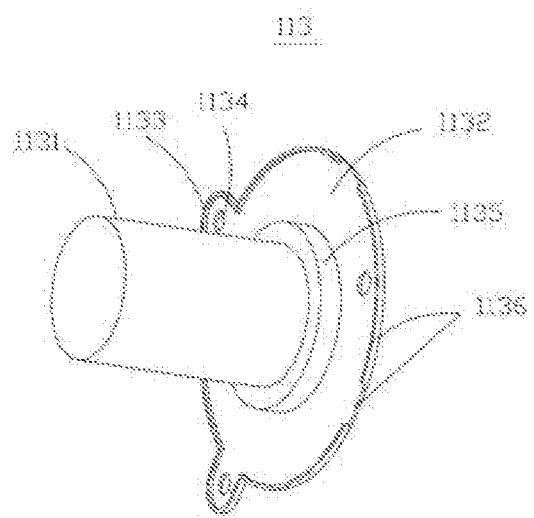
FIG. 9 is a structural schematic view of the sleeve in the present disclosure.
Figure 10:
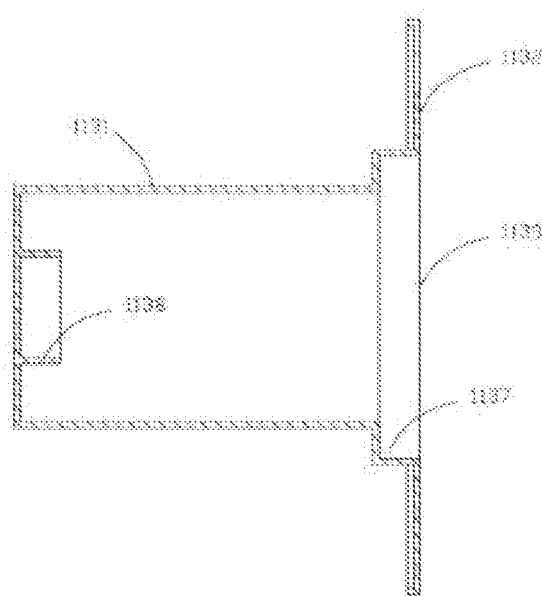
FIG. 10 is a perspective view of a motor shell in the present disclosure.

In combination with FIG. 9 and FIG. 10, optionally, the sleeve 113 includes a sleeve body 1131 and an annular flange 1132 connected to the sleeve body 1131, the sleeve body 1131 has one end being closed and the other end as the first opening end 1139, the flange 1132 is located at the first opening end 1139 and extends outward, the flange 1132 has an annular groove 1137 extending around a circumferential direction of the sleeve body 1131, and the third sealing ring 007 is provided in the annular groove 1137. The flange 1132 is provided with a through hole for a screw to pass through, to make the flange 1132 abut against the valve body 004 and screwed on the valve body 004 after the screw passes through the through hole, so as to realize the connection of the valve body 004 and the sleeve 113. The first opening end 1139/the third sealing ring 007/the closed end of the sleeve is provided with a rear bearing seat 1138 configured to be connected to the rotor.

Optionally, an outer surface of the valve body 004 has a planar mounting portion 401, the planar mounting portion 401 is provided with a through hole in communication with an inner cavity of the valve body 004 and an annular mounting groove (not shown in figure) surrounding the through hole, an end surface where the first opening end 1139 of the sleeve 113 is located is fitted to the planar mounting portion, the sleeve 113 is in communication with the through hole, and the third sealing ring 007 is provided in the annular mounting groove. That is, the position of the third sealing ring 007 is easy to determine, and the third sealing ring is easy to mount, and the position of the third sealing ring 007 is not easy to move, then the mounting quality is high; meanwhile, a sealing area of the third sealing ring 007 also may be increased, further improving the sealing effect. Optionally, the annular mounting groove and the annular groove 1137 may be disposed directly opposite to each other, so as to limit the third sealing ring 007 in a space formed by the annular mounting groove and the annular groove 1137.

Optionally, the rear bearing seat 1138 is located in the sleeve 113, the sleeve 113 has an inner bottom wall directly facing the first opening end 1139, the rear bearing seat 1138 is connected to the inner bottom wall of the sleeve 113, and the rear bearing seat 1138 is coaxial with the inner bottom wall.

Optionally, the sleeve body 1131 and the flange 1132 are molded in one piece, facilitating the processing and manufacturing, and the sleeve 113 has high structural strength, and is not easily damaged. Moreover, there is no connecting gap between the sleeve body 1131 and the flange 1132, and a sealing chamber jointly defined by the sleeve 113 and the valve body 004 has better sealability.

Optionally, the flange 1132 of the sleeve 113 is further provided with a second connecting lug 1133, a protruding direction of the second connecting lug 1133 is outward in a radial direction of the flange 1132, and the second connecting lug 1133 is provided with a first mounting hole 1134 for a screw or a bolt to pass through. The second connecting lug 1133 and the first mounting hole 1134 provided thereon are configured to be simultaneously connected to the valve body 004 and the motor shell 111. It should be noted that the number of second connecting lugs 1133 is set as needed. The number of second connecting lug(s) 1133 may be one or more. When the number of second connecting lugs 1133 is plural, a plurality of second connecting lugs 1133 are arranged at intervals along a circumferential direction of the flange. In the present disclosure, optionally, the number of second connecting lugs 1133 is two, and each second connecting lug 1133 is provided with one first mounting hole 1134.

Optionally, the tooth groove 1136 is further provided on an outer circumferential surface of the flange 1132 of the sleeve 113, and the tooth groove 1136 and the tooth groove 1113 on the motor shell 111 are in snap-fit assembling in a manner of tooth-groove fitting.

Optionally, the sleeve 113 is made of stainless steel, with a thickness of 0.2 mm~0.5 mm. Optionally, the sleeve 113 is made of austenitic stainless steel. The austenitic stainless steel not only has full and good comprehensive properties, such as rust resistance and corrosion resistance, but also has excellent plasticity and toughness.

Optionally, the rotor 115 is made of a plastic magnetic material. The plastic magnetic material is a material obtained by mixing a plastic as a binder with a magnetic powder, assisted by an appropriate adjuvant. The plastic magnetic material has the characteristics of small density and high impact resistance, which is not fractured during use, can be processed by a processing method commonly used for general plastic, can be processed into articles with high dimensional accuracy, thin walls, and complex shapes, and can be molded into articles with inserts. Processing the rotor using the plastic magnetic material can achieve miniaturization, light weight, precision, and high performance of the motor.

Figure 11:
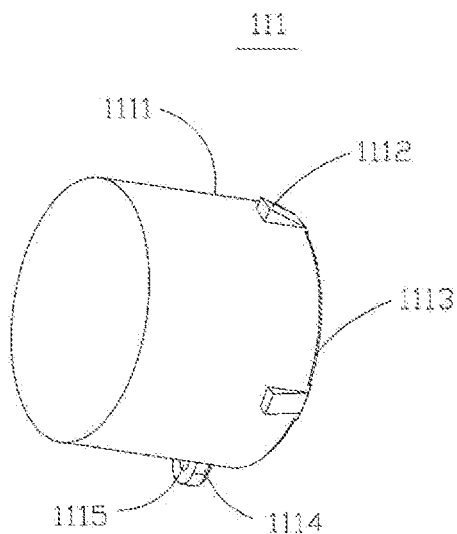
FIG. 11 is a structural schematic view of the motor shell in the present disclosure.
Figure 12:
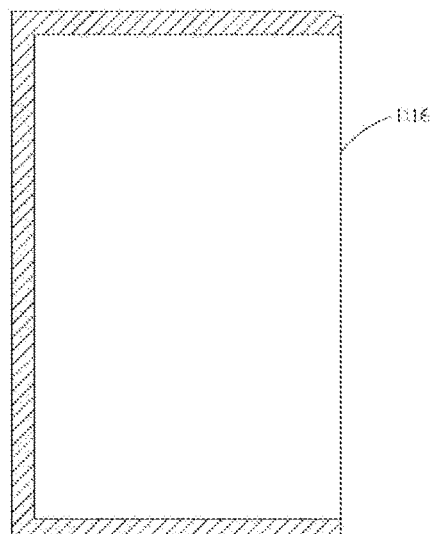
FIG. 12 is a perspective view of a valve body in the present disclosure.

In conjunction with FIG. 11 and FIG. 12, the motor shell 111 of the motor 11 may be connected to the valve body 004 by a screw, a snap-fit or a rivet. In the disclosure, the motor shell 111 has a casing 1111 in a cylindrical shape, a second opening end 1116 of the casing 1111 is provided with a snap-fit 1112 and a first connecting lug 1114, and the first connecting lug 1114 is provided with the second mounting hole 1115. The snap-fit 1112 is in snap-fit connection with the second clamping groove 46 on the valve body. The first connecting lug 1114 is aligned with the second connecting lug 1133 on the sleeve 113, and is fixed to the valve body 004 by a screw. This connection manner not only realizes the double connection between the snap-fit and the screw, but also realizes the integral connection between the motor shell 111, the sleeve 113, and the valve body 004. The second opening end 1116 of the casing 1111 is also provided with the tooth groove 1113, and is assembled with the tooth groove 1136 on the sleeve 113 in a manner of tooth-groove fitting.

Figure 13:
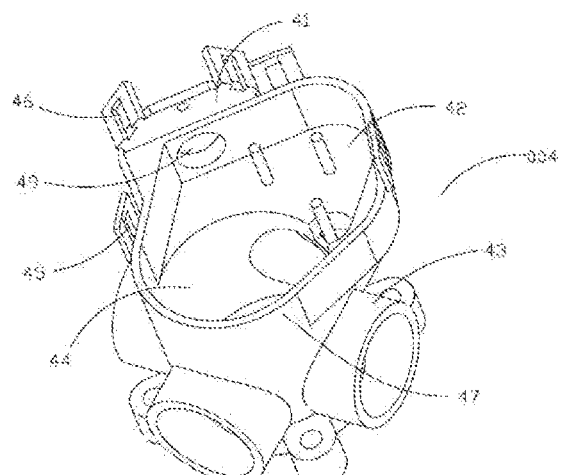
FIG. 13 is a perspective view of the valve body in the present disclosure from another angle of view.
Figure 14:
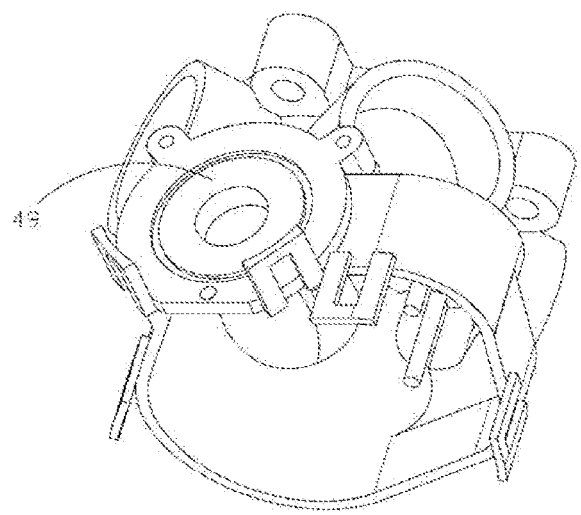
FIG. 14 is a structural schematic view of a valve cover in the present disclosure.

In conjunction with FIG. 13 and FIG. 14, the valve body 004 has an inner chamber and a connecting pipe connection port 43. The inner chamber includes an upper chamber 42 configured to place the gear train 12 and a motor shaft projection end, and a lower chamber 44 for placing the valve core 31. Since the static sealing structure is designed in the present disclosure, the upper chamber 42 and the lower chamber 44 may be in full communication with each other, then there is no need to seal between the valve core 31 and the upper chamber 42, which reduces the sealing structure and saves costs. The connecting pipe connection port 43 is provided in the lower chamber 44, and in communication with the lower chamber 44. The number of connecting pipe connection ports 43 is at least two. Optionally, the connecting pipe connection ports 43 are four, and arranged in a "cross" shape. When pipelines used are less than four, the excess connecting pipe connection ports 43 are just blocked by a plug. The valve body 004 may be manufactured as a unified module, which can save the mold cost.

Optionally, the valve body 004 is further provided with the motor mounting seat 41, and the motor mounting seat 41 may be formed on a side wall 47 of the valve body 004, or may be provided on the side wall 47 of the valve body 004 so as to be connected to the valve body 004. The motor mounting seat 41 is provided with the perforation hole 49 for the rotor 115 to pass through. The motor mounting seat 41 is further provided with a second clamping groove 46 connected to the motor shell 111 and clamped with the snap-fit 1112 provided on the motor shell 111. The motor mounting seat 41 is further provided with a front bearing seat cavity 48 of the motor.

The valve body 004 is further provided with a first clamping groove 45 connected to a PCB box 22, and is cooperatively connected to the snap-fit 25 on the PCB box 22.

Figure 15:
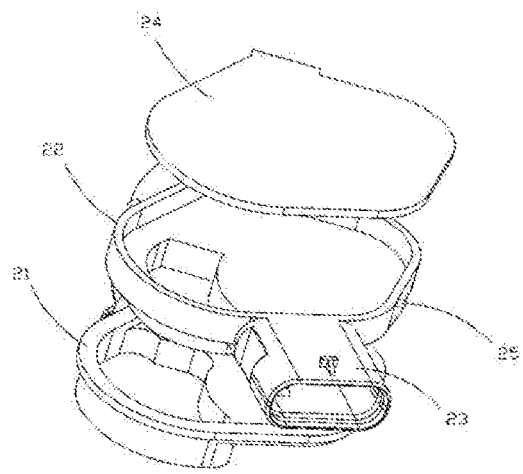
FIG. 15 is a structural schematic view of a variation structure of the electronic valve in the present disclosure.

In conjunction with FIG. 15, the valve cover 002 includes a valve body sealing plate 21, and the valve body sealing plate 21 is welded with the valve body 004 so as to ensure the sealing of environment in the liquid medium.

Optionally, the PCB box 22 and an upper end cover 24 arranged in sequence are further provided above the valve body sealing plate 21, the control board 13 is disposed in the PCB box 22, and the upper end cover 24 is connected to the PCB box 22. A junction box 23 is further provided on one side of the PCB box 22.

Optionally, the PCB box 22 may be connected to the valve body sealing plate 21, and connection manners of the two include, but are not limited to, fixation by a screw, a snap-fit or a rivet. In the present disclosure, the PCB box 22 is provided with the snap-fit 25 clamped with the first clamping groove 45 on the valve body 004.

Figure 16:
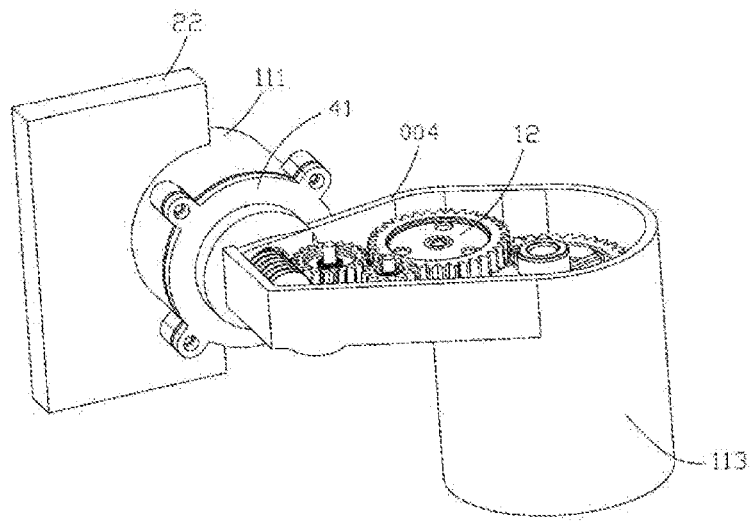
FIG. 16 is a schematic view of a sealing structure of the electronic valve in the present disclosure.

Referring to FIG. 16, an exemplary embodiment of another electronic valve with a static sealing structure according to the present disclosure is shown. In the illustrated embodiment, the motor mounting seat 41 is disposed outside the valve body 004, and the sleeve 113, the motor mounting seat 41, and the valve body 004 are molded in one piece. The PCB box 22 is provided on the motor shell 111, and a lead-out wire of the motor 11 can be directly guided into the PCB box 22 and connected to the control board 13 provided therein.

Figure 17:
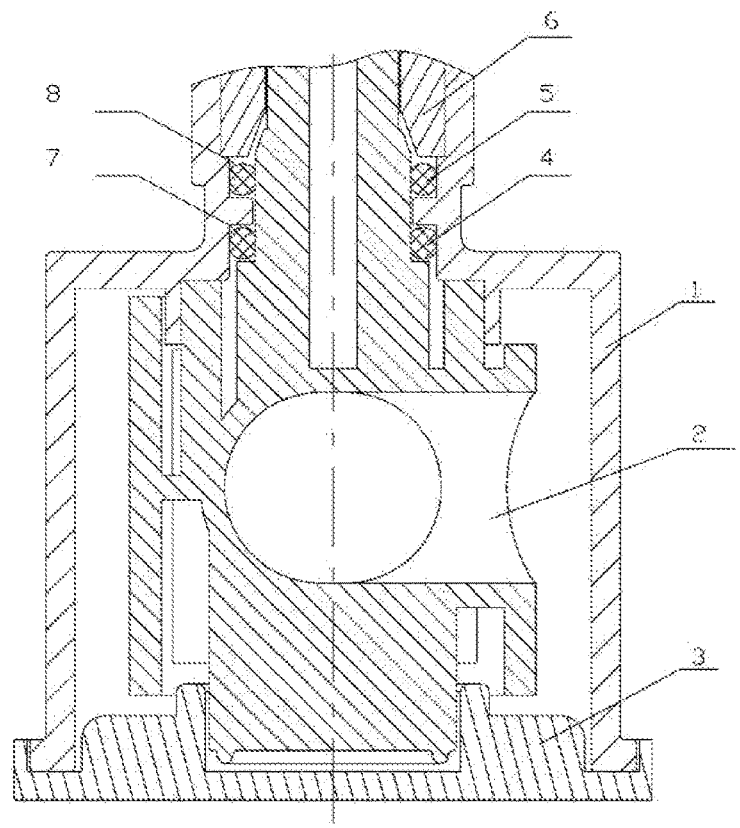
FIG. 17 is a structural schematic view of the valve body of the electronic valve in the present disclosure.
Figure 18:
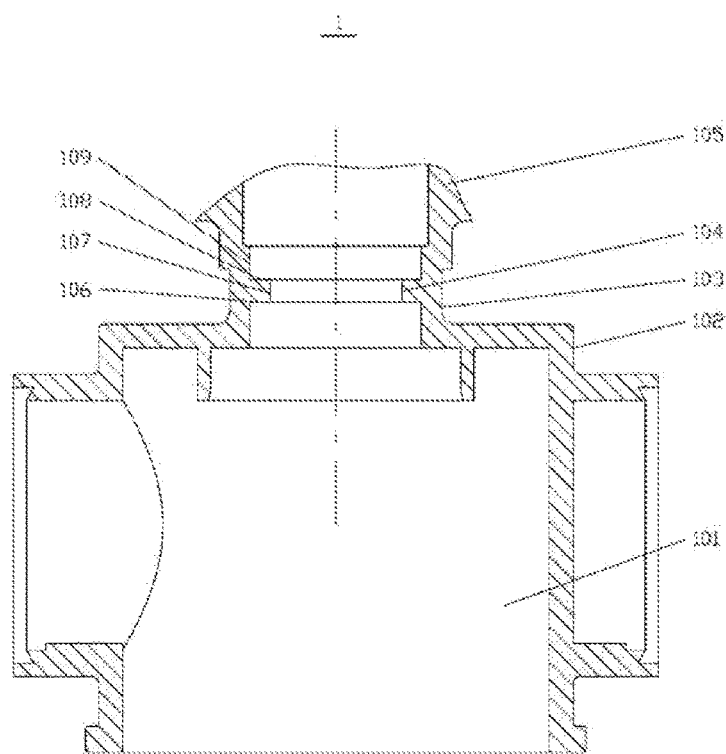
FIG. 18 is a structural schematic view of a valve core of the electronic valve in the present disclosure.
Figure 19:
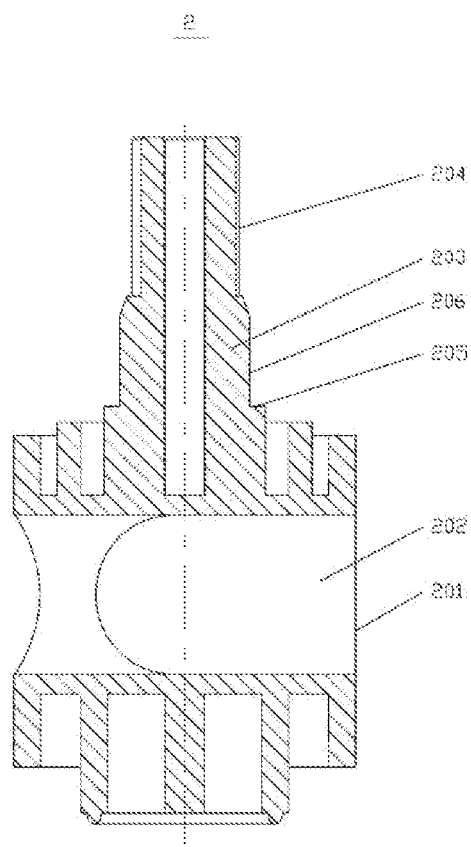
FIG. 19 is a structural schematic view of an embodiment of the valve body of the electronic valve with reinforcing ribs in the present disclosure.

Referring to FIG. 17, FIG. 18, and FIG. 19, an exemplary embodiment of an electronic valve with a double sealing structure according to the present disclosure is shown. In the illustrated embodiment, the electronic valve includes a valve body 1 and a valve core 2, the valve body 1 is formed as one piece by injection molding, a first sealing ring 4 and a second sealing ring 5 are provided between the valve body 1 and the valve core 2 to prevent the fluid medium from leaking into an upper power device mounting space (not shown in figure), the first sealing ring 4 and the second sealing ring 5 are arranged at intervals vertically along an axial direction of the valve core, in other words, the first sealing ring 4 and the second sealing ring 5 are arranged at intervals along an axis of the valve core, and the first sealing ring 4 is further away from the bottom of the valve body 1 than the second sealing ring 5.

Optionally, referring to FIG. 17 and FIG. 18, the valve body 1 includes a valve body upper portion 105, a valve body neck portion 103, and a valve body lower portion 102 which are connected in sequence, and the valve body upper portion 105, the valve body neck portion 103, and the valve body lower portion 102 together form a valve core accommodating chamber 101 configured to accommodate the valve core 2. An inner diameter of the valve body upper portion 105 and an inner diameter of the valve body lower portion 102 are both larger than an inner diameter of the valve body neck portion 103, and the first sealing ring 4 and the second sealing ring 5 are provided in the valve body neck portion 103.

Optionally, the valve body upper portion 105, the valve body neck portion 103, and the valve body lower portion 102 are formed as one piece.

Optionally, referring to FIG. 17 and FIG. 19, the valve core 2 includes a core body 201 and a valve rod 203 connected with each other, a flow channel 202 is provided on the core body 201, and a stepped surface 205 is provided at a junction between the valve rod 203 and the core body 201; the first sealing ring 4 and the second sealing ring 5 are provided at a place where the valve body neck portion 103 and the valve rod 203 cooperate with each other, so as to seal a gap between the valve body neck portion 103 and the valve rod 203. In other words, after the valve core 2 cooperates with the valve body 1, the core body 201 of the valve core 2 is located in the valve body lower portion 102, the valve rod 203 of the valve core 2 passes through the valve body neck portion 103 and extends into the valve body upper portion 105, an annular space is formed between the valve rod 203 and the valve body neck portion 103, the first sealing ring 4 and the second sealing ring 5 are both sheathed outside the valve rod 203 and located in the annular space. The outer circumferential surface of the valve rod 203 is in sealing contact with the first sealing ring 4 and the second sealing ring 5 simultaneously, and an inner circumferential wall of the valve body neck portion 103 is in sealing contact with the first sealing ring 4 and the second sealing ring 5 simultaneously, so as seal the annular space between the valve rod 203 and the valve body neck portion 103.

Optionally, a gear 6 is sleeved on the valve rod 203, the valve rod 203 rotates with the rotation of the gear 6, and the gear 6 is configured to be in transmission cooperation with the upper power device, so as to transmit the torque to the gear 6 and to the valve rod 203, thereby enabling the valve rod 203 to rotate, and realizing the switching of the flow channel. Meanwhile, the gear 6 is located in the valve body upper portion 105, and an end surface of the gear 6 facing the valve body lower portion 102 is spaced from the second sealing ring 5, so as to reduce wear of the second sealing ring 5, and the movement of the second sealing ring 5 away from the first sealing ring 4 is limited by the gear 6, then the position of the second sealing ring 5 is stable.

Optionally, the inner circumferential wall of the valve body neck portion 103 is provided with a convex ring 104, and the convex ring 104 is of an annular structure, and extends along the circumferential direction of the valve body neck portion 103. The convex ring 104 has a top plane 108 facing away from the valve body lower portion 102 and a bottom plane 106 opposite to the top plane 108, and the top plane 108, the inner circumferential surface 109 of the valve body neck portion 103, and a first outer circumferential surface 206 of the valve rod 203 together form a first sealing ring groove 7 in a ring shape; a bottom plane 106 of the convex ring 104, an inner circumferential surface 109 of the valve body neck portion 103, and the first outer circumferential surface 206 of the valve rod together form a second sealing ring groove 8 in a ring shape. The first sealing ring 4 is located in the first sealing ring groove 7, the second sealing ring 5 is located in the second sealing ring groove 8, the first sealing ring 4 and the second sealing ring 5 are located at two sides of the convex ring 104 in axial direction, and the positions of the two sealing rings are determined so as to facilitate installation; moreover, the movement of the first sealing ring 4 toward the second sealing ring 5 is blocked by the convex ring 104, the movement of the second sealing ring 5 toward the first sealing ring 4 is blocked by the convex ring 104, and the movement of the second sealing ring 5 facing away from the first sealing ring 4 is blocked by the stepped surface 205, then the first sealing ring 4 and the second sealing ring 5 are less likely to move along the axial direction of the valve rod 203, and are more stable in position.

Optionally, the inner circumferential surface 109 of the valve body neck portion 103 and the first outer circumferential surface 206 of the valve rod 203 serve as sealing surfaces, and form an interference fit with the first sealing ring 4 and the second sealing ring 5. The first sealing ring 4 is in clearance fit with the bottom plane 106, the first sealing ring 4 is in clearance fit with the stepped surface 205, and the second sealing ring 5 is in clearance fit with the top plane 108. As the valve core 2 is rotatably matched with the valve body 1, none of the two sides of the first sealing ring 4 along the axial direction of the valve rod 203 and the two sides of the second sealing ring 5 along the axial direction of the valve rod 203 is in contact with the valve body 1 and the valve rod 2, then the wear of the first sealing ring 4 and the second sealing ring 5 can be reduced, which is helpful in prolonging the service life of the sealing rings, and reducing the costs.

Optionally, at least one of the first sealing ring 4 and the second sealing ring 5 may be an O-ring or an X-ring. Obviously, structures of the first sealing ring 4 and the second sealing ring 5 may be configured to be different, for example, the first sealing ring 4 is an O-ring, and the second sealing ring 5 is an X-ring. In addition, the structures of the first sealing ring 4 and the second sealing ring 5 may be configured to be the same.

In the present disclosure, optionally, the electronic valve further includes a lower end cover 3, the valve body lower portion 102 is configured to be open, and the lower end cover 3 is detachably connected to the valve body lower portion 102, so as to facilitate assembling the valve core 2 from the valve body lower portion 102 into the valve body 1.

Figure 20:
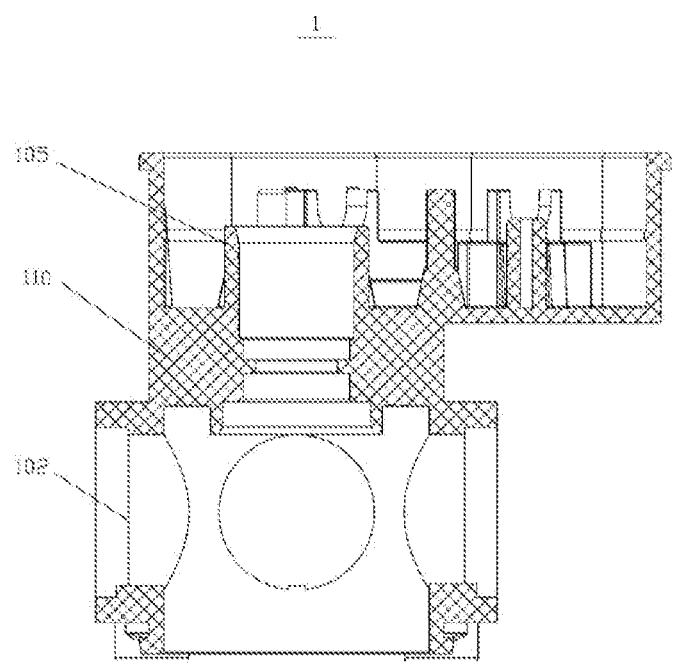
FIG. 20 is a schematic view of the sealing structure part of the electronic valve in the present disclosure.

Referring to FIG. 20, the present disclosure further provides a sealing structure of an electronic valve. In the present disclosure, a reinforcing rib 110 is provided between the outer circumferential wall of the valve body neck portion 103 and the valve body lower portion 102, then the strength of the valve body 1 can be greatly improved without increasing the size and wall thickness of the valve body 1.

Optionally, the structure and shape of the reinforcing rib 110 is not limited, and it is appropriate to achieve the purpose of enhancing the structural strength of the valve body 1. For example, the reinforcing rib 110 is provided radially with the axis of the valve core 2 as a center, in the number of 2~4. Optionally, a plurality of reinforcing ribs 110 are arranged equally. In other words, the number of reinforcing ribs 110 is plural, the plurality of reinforcing ribs 110 are arranged at equal intervals around the axis of the valve core 2, and the plurality of reinforcing ribs 110 are arranged radially with the axis of the valve core 2 as the center.

Optionally, the reinforcing rib 110 is of a plate-shaped structure.

The sealing structure of an electronic valve provided in the present disclosure may greatly enhance the sealing effect of the electronic valve, and help to increase the reliability of the product and can prolong the service life. Since the valve body of the sealing structure of the electronic valve of the present disclosure adopts a one-piece structure, no sealing ring needs to be provided between the valve body upper portion 105 and the valve body lower portion 102, and the overall sealing effect of the electronic valve is improved without increasing the number of sealing rings.

Meanwhile, the sealing structure of the electronic valve provided in the present disclosure is reasonable in the structural design, with the valve body upper portion 105 and the valve body lower portion 102 being integrally molded, thus reducing the number of parts of the electronic valve product, reducing the assembling process of the valve body upper portion 105 and the valve body lower portion 102, meanwhile reducing the number of molds of the product parts, greatly shortening the development cycle of the product, and reducing the research and development cost of the product; moreover, the one-piece electronic valve is molded into one piece by a mold, then the size of the product is more easily ensured, and meanwhile the weight of the whole product is reduced, and it is easier to meet the requirements of light weight goal and integration goal of a host factory.

In the present disclosure, optionally, the electronic valve may include the sealing member, the double sealing structure of an electronic valve, and the static sealing structure of an electronic valve mentioned above, in other words, the sealing member 10 mentioned above may be provided between the connecting pipe 005 and the connecting pipe connection port 43 so as to realize the sealing connection; and the first sealing ring 4 and the second sealing ring 5 mentioned above may be provided between the core rod of the valve core 31 and the valve body 004 so as to realize the sealing connection.

It should be understood that the above embodiments merely illustrate the present disclosure, rather than limiting the present disclosure, and any variations not going beyond the scope of essential spirit of the present disclosure falls within the scope of protection of the present disclosure.

INDUSTRIAL APPLICABILITY

In summary, the present disclosure provides a sealing member for an electronic valve, an electronic valve with a sealing member, an electronic valve with a static sealing structure, and an electronic valve with a double sealing structure, with good sealing effect, and a long service life.

What is claimed is:

1. A sealing member for an electronic valve,
wherein the sealing member is provided between a valve core and a connecting pipe inside the electronic valve, the sealing member has an inlet end connected to the valve core and an outlet end connected to the connecting pipe, wherein the inlet end of the sealing member is in interference fit with the valve core, to form a first sealing region;
wherein an inner wall of the sealing member is provided with annular ribs, and the ribs are in interference fit with an outer circumferential surface of an end of the connecting pipe, to form a second sealing region; and
wherein the end of the connecting pipe is further provided with an annular sealing plane, and the sealing plane is in fit with the outlet end of the sealing member, to form a third sealing region.

2. The sealing member according to claim 1, wherein at least two ribs are provided, and the at least two ribs are arranged at intervals in a direction from the inlet end to the outlet end.

3. The sealing member according to claim 1, wherein an inner diameter of the sealing member gradually increases in a direction from the inlet end to the outlet end, and correspondingly, the connecting pipe has a sleeving part where the connecting pipe and the sealing member are sleeved with each other, wherein an outer diameter of the sleeving part gradually increases from an end close to the valve core to an end away from the valve core.

4. The sealing member according to claim 1, wherein the inlet end of the sealing member has an inlet end surface fitted with the valve core, wherein the inlet end surface is provided with an abrasion-resistant lubricating coating.

5. The sealing member according to claim 1, wherein an interference amount of a fitting between the ribs and the connecting pipe is not less than 5%.

6. The sealing member according to claim 1, wherein an interference amount of a fitting between the inlet end of the sealing member and the valve core is not less than 5%.

7. An electronic valve, comprising a valve body, a flow rate control device and a connecting pipe, wherein the flow rate control device comprises a valve core; and the valve body is provided therein with a valve core accommodating chamber and a connecting pipe connection port, wherein the valve core is provided in the valve core accommodating chamber; and the connecting pipe is welded to an end portion of the connecting pipe connection port on the valve body, wherein the electronic valve further comprises the sealing member according to claim 1, and the sealing member is located between the connecting pipe and the connecting pipe connection port.

8. The electronic valve according to claim 7, wherein the electronic valve further comprises a power device, the power device comprises a gear train, a control board and a motor, the motor comprises a shell, a stator and a rotor, wherein a sleeve is provided between the stator and the rotor, an opening end of the sleeve is connected to the valve body, and the rotor, the gear train and the valve core are all placed in a closed fluid medium environment; and a sealing ring is provided between the opening end of the sleeve and the valve body so as to form a static sealing structure.

9. The electronic valve according to claim 8, wherein the sleeve comprises a sleeve body and an annular flange connected to each other, wherein the sleeve body has one end being closed and the other end as the opening end, the flange is located at the opening end and extends outward, the flange has an annular groove extending around a circumferential direction of the sleeve body, and the sealing ring is provided in the annular groove.

10. The electronic valve according to claim 8, wherein the sleeve and the valve body are molded in one piece.

11. The electronic valve according to claim 8, wherein the sleeve is fixedly connected to the valve body by a screw, a snap-fit or a rivet.

12. The electronic valve according to claim 8, wherein an outer surface of the valve body has a planar mounting portion, wherein the planar mounting portion is provided with a through hole in communication with an inner cavity of the valve body and an annular mounting groove surrounding the through hole, an end surface where the opening end of the sleeve is located is fitted to the planar mounting portion, the sleeve is in communication with the through hole, and the sealing ring is provided in the annular mounting groove.

13. The electronic valve according to claim 8, wherein the shell is detachably connected to the valve body.

14. The electronic valve according to claim 8, wherein an output shaft of the motor extends into the valve body, and the output shaft is in transmission connection with an input gear of the gear train, and an output gear of the gear train is configured to drive the valve core to move.

15. The electronic valve according to claim 8, wherein the electronic valve further comprises a valve cover, wherein the valve cover is welded to the valve body.

16. The electronic valve according to claim 7, wherein the valve body is formed as one piece by injection molding, a first sealing ring and a second sealing ring are provided between the valve body and the valve core, so as to prevent a cooling liquid from leaking into an upper power device mounting space, wherein the first sealing ring and the second sealing ring are arranged at intervals vertically along an axial direction of the valve core, so as to form a double sealing structure.

17. The electronic valve according to claim 16, wherein the valve body comprises a valve body upper portion, a valve body neck portion and a valve body lower portion that are connected in sequence, wherein the first sealing ring and the second sealing ring are provided in the valve body neck portion.

18. The electronic valve according to claim 16, wherein an inner circumferential surface of the valve body is provided with a convex ring, wherein a top plane of the convex ring facing away from a valve body lower portion, an inner circumferential surface of the valve body and an outer circumferential surface of a valve rod form a first sealing ring groove in a ring shape, and the first sealing ring is provided in the first sealing ring groove; and a bottom plane of the convex ring close to the valve body lower portion, an inner circumferential surface of the valve body neck portion and the outer circumferential surface of the valve rod form a second sealing ring groove, and the second sealing ring is provided in the second sealing ring groove.

19. The electronic valve according to claim 18, wherein the first sealing ring is spaced from the top plane, and/or the second sealing ring is spaced from the bottom plane.

20. The electronic valve according to claim 16, wherein the valve core comprises a core body and a valve rod, wherein the core body is provided with a flow channel, a stepped surface protruding from an outer circumferential surface of the valve rod is provided at a junction between the valve rod and the core body; and the first sealing ring and the second sealing ring are sheathed outside the valve rod.

\* \* \* \* \*